US011879270B2

(12) United States Patent
Szczerkowski et al.

(10) Patent No.: US 11,879,270 B2
(45) Date of Patent: Jan. 23, 2024

(54) DOOR, LOCK, OPERATOR, ASSEMBLY AND ASSOCIATED METHODS

(71) Applicant: SAFEHINGE LIMITED, Glasgow (GB)

(72) Inventors: Max Szczerkowski, Glasgow (GB); Martin Izod, Glasgow (GB); Shaun Ridley, Glasgow (GB)

(73) Assignee: SAFEHINGE PRIMERA LIMITED, Glasgow (GB)

( * ) Notice: Subject to any disclaimer, the term of this patent is extended or adjusted under 35 U.S.C. 154(b) by 259 days.

(21) Appl. No.: 17/055,443

(22) PCT Filed: May 13, 2019

(86) PCT No.: PCT/GB2019/051300
§ 371 (c)(1),
(2) Date: Nov. 13, 2020

(87) PCT Pub. No.: WO2019/220083
PCT Pub. Date: Nov. 21, 2019

(65) Prior Publication Data

US 2021/0214972 A1 Jul. 15, 2021

(30) Foreign Application Priority Data

May 13, 2018 (GB) .................................... 1807750

(51) Int. Cl.
*E05B 63/00* (2006.01)
*E05B 1/00* (2006.01)
(Continued)

(52) U.S. Cl.
CPC .......... *E05B 63/0069* (2013.01); *E05B 1/003* (2013.01); *E05B 1/0053* (2013.01); *E05B 7/00* (2013.01); *E05B 13/005* (2013.01); *E05B 15/0046* (2013.01); *E05B 17/0062* (2013.01)

(58) Field of Classification Search
CPC .... E05B 63/0069; E05B 1/003; E05B 1/0053; E05B 7/00; E05B 13/005; E05B 15/0046; E05B 17/0062
See application file for complete search history.

(56) References Cited

U.S. PATENT DOCUMENTS 5,403,047 A * 4/1995 Walls ........................ E05C 1/14
292/336.3
5,450,734 A 9/1995 Essaki
(Continued)

OTHER PUBLICATIONS

Int'l Search Report; PCT/GB2019/051300; dated May 13, 2019.

*Primary Examiner* — Mark A Williams
(74) *Attorney, Agent, or Firm* — Dickinson Wright PLLC

(57) ABSTRACT

The present invention relates to an anti-barricade door handle assembly which comprises an integrated auxiliary door handle for use in an emergency. The auxiliary door handle can be configured between a stowed configuration and an activated configuration. The auxiliary door handle is operable to operate a lock when in the activated configuration and inoperable when in the stowed configuration. The auxiliary door handle can only be configured to the activated configuration by an authorized user. The auxiliary door handle is configured to override a primary door handle which operates the lock in normal, non-emergency use.

19 Claims, 4 Drawing Sheets

(51) Int. Cl.

| | |
|---|---|
| ***E05B 7/00*** | (2006.01) |
| ***E05B 13/00*** | (2006.01) |
| ***E05B 15/00*** | (2006.01) |
| ***E05B 17/00*** | (2006.01) |

(56) References Cited

U.S. PATENT DOCUMENTS

| | | | | |
|---|---|---|---|---|
| 6,722,716 | B2 * | 4/2004 | Baser | E05B 17/2034<br>292/DIG. 31 |
| 8,579,337 | B2 | 11/2013 | Hidding et al. | |
| 9,890,556 | B2 * | 2/2018 | Fink | E05B 13/10 |
| 9,890,569 | B2 * | 2/2018 | Shah | E05C 1/14 |
| 11,124,996 | B2 * | 9/2021 | Yalamati | E05C 1/14 |
| 2015/0084354 | A1 | 3/2015 | Lee | |
| 2015/0197968 | A1 * | 7/2015 | Shen | E05B 9/08<br>292/137 |
| 2015/0292249 | A1 * | 10/2015 | Alfredsson | E05B 65/48<br>70/2 |
| 2015/0337570 | A1 * | 11/2015 | Powell | E05B 63/14<br>292/336.3 |
| 2016/0186463 | A1 * | 6/2016 | Roatis | E05B 1/003<br>70/266 |
| 2016/0237719 | A1 | 8/2016 | Clifford | |
| 2016/0251876 | A1 * | 9/2016 | Carlsson | E05B 47/0012<br>70/445 |
| 2018/0347229 | A1 * | 12/2018 | Riley | E05B 1/003 |
| 2020/0362607 | A1 * | 11/2020 | Srnoyachki | E05B 15/0046 |
| 2021/0095495 | A1 * | 4/2021 | Wesley | E05D 11/1014 |
| 2022/0081931 | A1 * | 3/2022 | Bennett | E05B 1/0053 |

* cited by examiner

DOOR, LOCK, OPERATOR, ASSEMBLY AND ASSOCIATED METHODS

CROSS-REFERENCE TO RELATED APPLICATIONS

The present application is a Section 371 National Stage of International Application PCT/GB2019/051300, filed 13 May 2019, and through which priority is claimed to UK Patent Application 1807750.3, filed 13 May 2018.

TECHNICAL FIELD

This disclosure concerns door furniture or fittings, and associated methods. In particular, but not exclusively, examples of this disclosure concern operators for locks for doors, such as handles for latches, and door systems comprising the operators.

BACKGROUND

In buildings which house vulnerable individuals there is often a need to adapt aspects of the buildings to make them safer than conventional buildings. Such individuals are, in many cases, more liable to accidents and, in some case, may be prone to harming themselves intentionally.

One particular example of this is buildings which house individuals with mental health problems. Such individuals can be at risk of attempting to harm or kill themselves, and measures must be taken to minimise the risk of this.

One particular concern is that individuals may attempt to hang themselves. To mitigate the risk of this, individuals at risk are routinely deprived of materials which can be used as ligatures to hang themselves, such as belts, draw cords etc. However, there remains a risk that individuals will be able to obtain or fabricate something, such as by tearing strips of fabric from bedding, using headphone cables or the like. These can be looped around ligature points.

Accordingly, a parallel approach of eliminating ligature points in rooms where vulnerable individuals are to be left unsupervised is often undertaken. This involves elimination of any points where a cord or the like can be secured in order to bear the weight of the person trying to hang themselves.

Doors provide a specific challenge in providing an anti-ligature assembly. By their hanging nature there are number of features which provides various ligature points, in particular door handles, hinges, and the top of the door. For example, in a conventional butt hinge door, the top hinge is a ligature point.

This is especially the case with doors which require to self-close, e.g. in line with fire regulations or for security or privacy purposes. Self-closing mechanisms, such as the commonly used face-fixed spring lever arm provide a ligature point.

One important consideration is ensuring that doors cannot readily be barricaded. In this case an outward-opening door, to counter a barricade from the inside. Similarly, a double-action door (also known as a double-swing door) is desirable because it can open both ways. However, many existing anti-ligature doors are not double-acting. Those that are double-acting are typically expensive and complex to install.

The present inventors have recognised that prior art systems have associated limitations or problems. The present inventors have proposed improvements, such as in patent applications GB1716453.4 and PCT/EP2018/059206, the contents of which are incorporated herein by reference. Nonetheless, the present inventors considered that there remains a need for alternative or improved door assemblies for use in situations where anti-barricade and/or anti-ligature properties are desired.

SUMMARY

According to a first aspect there is provided an operator for operating a door lock. The operator may comprise a lock operator, such as a door lock operator.

The operator may comprise a manual operator. The operator may comprise a mechanical operator. The operator may comprise a handle. The operator may comprise a lever. The operator may comprise a lever-handle. The operator may comprise a pull-handle. The handle may be configured to operate the lock by the operator being pulled in a downwards direction. Operation of the operator by a downward pulling motion may enable a user to utilise a portion of their weight in the operation of the lock. Operation of the lock may comprise an unlocking operation. Optionally, operation of the lock may comprise an at least temporary disablement of the lock, such as disablement in an unlocked configuration. The operator may comprise a pivot handle. The pivot handle may pivot about a horizontal pivot axis. The horizontal pivot axis may be in, or may be parallel to, a plane with the door, such as in plane with the side of the door to which the operator is mounted. The operator may comprise a grip portion attached to an arm. The grip portion may be spaced from the horizontal pivot axis by the arm. The grip portion may be positioned above the pivot axis, such as directly above the pivot axis, when in the stowed configuration. The stowed configuration may correspond to a vertical position of the arm. The auxiliary door handle may be configured between the stowed and activation configurations by pivoting about the horizontal pivot axis. The auxiliary door handle may operate the lock by pivoting about the horizontal pivot axis, such as further downward pivoting from the activated configuration to a fully-operated configuration. The activated configuration may correspond to an angle between the arm and vertical of between 30 degrees and 60 degrees, such as about 45 degrees. The fully-operated configuration may correspond to the arm being horizontal, with an angle of around 90 degrees between the arm and vertical. The fully-operated configuration may correspond to a fully-unlocked configuration.

There may be a pair of arms, each arm connecting the grip portion to the pivot axis. The grip portion may be positioned between upper ends of the arms (when in the stowed configuration). The lower end/s of the arm/s may be pivotably mounted to define the pivot axis. The operator may be configured to aid opening of the door, such as by providing a better grip for pulling the door open via the operator than via another operator, such as the primary operator. For example, the grip portion of the operator may be configured to allow a power grip, such as with all of the user's fingers wrapping around the grip portion. A grip portion of the other operator, such as of the primary and/or corresponding operator, may be configured to provide less grip than the grip portion of the operator.

The operator may comprise an auxiliary operator. The operator may comprise an emergency operator. The operator may be inoperable in normal use of the lock.

The operator may be configured for use by authorised personnel, such as for use only by authorised personnel. The operator may be configured to be inoperable by unauthorised personnel. The operator may be configured to be operable only when activated by an authorised user.

The operator may be reconfigurable between a stowed configuration and a primed or activated configuration. The stowed configuration may be whereby the operator is inoperable and/or inaccessible, such as inoperable and inaccessible for unauthorised personnel. The stowed configuration may correspond to a normal use configuration of the door handle assembly, such as where normal operation of the lock is achieved via the primary operator. The primed or activated configuration may correspond to an emergency configuration, such as where emergency operation of the lock may be desired via the operator. In the primed or activated configuration, the operator may be accessible for gripping by a user to operate the lock, such as to unlock the lock in an emergency situation. The emergency situation may comprise a barricade situation, such as where the door cannot be unlocked and/or opened, or at least not unlocked or opened easily, by operation of the primary operator.

The operator may be configured to be operable when activated by an activation element, such as an activation element associated with an authorised user. The activation element may comprise an operator release tool. The activation element may comprise a key. The key may comprise an authorised user key, such as a staff key. The key may comprise a staff-only key. The activation element may comprise a mechanical activation element. The activation element may comprise an electronic activation element. The operator may be configured to be activatable by either and both of a mechanical activation element and an electronic activation element. For example, the operator may be configured to be discretely activated or primed by the mechanical activation element or the electronic activation element. The mechanical activation element and the electronic activation element may provide alternative, redundant or back-up activation means, such as in an absence or failure of one of the electronic or the mechanical activation elements. The mechanical activation element may comprise a mechanical key receivable in a keyway. The keyway may comprise an anti-tamper keyway, such as a Lifeline™ keyway. The electronic activation element may comprise a contactless activation element, such as a WiFi, RFID or similar element.

The operator may comprise a secondary operator, supplementary to a primary operator. The primary operator and the secondary operator may be located on a same side of a door, such as both being located on an outside or exterior side of the door.

The operator may comprise an override operator. The operator may be configured to override at least one other operator, such as the primary operator. The operator may be configured to circumvent the other operator. The operator may be configured to effectively disable and/or bypass the other operator. The operator may be configured to dominate the other operator.

The operator may be configured to allow staged or progressive operation of the lock. In at least some examples, the operator may be configured to allow partial operation of the lock by the operator, such that the authorised user can operate the lock incrementally. The operator may comprise, or may be configured to actuate, a progressive or one-way element. Providing a progressive or one-way element, such as a ratchet, may enable the user to progressively operate the lock, such as in stages without losing all previous progress in operating the lock. For example, in an emergency situation whereby an unauthorised user, such as an inmate, patient, or the like, has attempted to barricade the door, the progressive or one-way element may enable the authorised user to exert force to operate the lock incrementally in stages or bursts, without the lock returning to the locked position, such as under force from an unauthorised user. The progressive or one-way element may be configured to prevent undesired reconfiguration of the lock. For example, a ratchet may fix the lock in position, such as in an open, unlocked position; at least temporarily preventing or inhibiting reversion of the lock to a locked or partially-locked configuration.

The operator may be configured to exert a greater force on the lock. The operator may be configured to exert a greater torque on the lock. The operator may be configured to exert a greater moment on the lock. The greater force, torque and/or moment may be greater than that exerted or exertable via the primary operator and/or the corresponding primary operator. The operator may be configured to allow a user to exert a greater force, torque and/or moment on the lock. The operator may be configured to allow an authorised user to exert a greater force, torque and/or moment on the lock than an unauthorised user. For example, where an authorised user is attempting to operate the lock from one side of the door and an unauthorised user, such as a patient or inmate, on an opposite side of the door is barricading or attempting to barricade the door, the operator may assist the authorised user in operating the lock, overriding a primary or corresponding primary operator accessible by the unauthorised user on the opposite side of the door. The operator may provide a longer lever arm than the primary and/or corresponding primary operator/s. The operator may provide a greater force, torque and/or moment in the order of at least two times, optionally at least three times, optionally at least five times, that of the primary and/or corresponding primary operator/s.

The operator may be connected to the lock via a linkage. The linkage may provide a mechanical advantage, such as between where force is applied by a user (e.g. a grip) and the lock. The linkage may contribute to a total mechanical advantage of the operator that exceeds a mechanical advantage available via the primary and/or corresponding primary operator. The mechanical advantage may comprise a force, torque and/or moment.

The primary operator may comprise a handle, such as a turn/pull, knob, lever-handle or the like. The primary operator may comprise a primary handle. The primary operator may be connected to a corresponding primary operator on an opposite side of the door, such as a corresponding primary operator on an interior side of the door when the primary operator is located on an exterior side of the door. The primary operator may be connected to the lock and/or the corresponding primary operator via a connecting member, such as a spindle.

The connecting member/s may be configured to prevent or at least impede operation of the lock by at least one primary operator, such as to prevent or at least impede operation in an emergency and/or during operation of the operator. The spindle may comprise a predefined weakness configured to break at a predefined location. The predefined location may prevent or at least impede operation of the lock from a particular operator. For example, the predefined location may disconnect one of the operators, such as the corresponding primary operator. The spindle may be configured to fail at the predefined weakness only at a or above a predetermined load. The predetermined load may be above a normal use load. The predetermined load may correspond to a load anticipated in an emergency or barricade situation.

The operator may comprise an anti-ligature operator. The operator may be configured to impede or at least reduce a risk of ligature attachment. The operator may be at least partially concealed. The operator may be configured to be flush, such as flush with a surrounding surface/s (e.g. of the associated door, door furniture, fixing/s or the like). The operator may be configured to be recessed.

The operator may be tamper-proof or at least tamper-resistant.

The lock may comprise a latch, such as a sprung latch, night latch or the like. The lock may comprise a bolt, such as a spring-bolt, deadbolt or the like.

The operator may be configured for buildings which house vulnerable individuals, such as buildings which house individuals with mental health problems. The operator may be configured to prevent or mitigate against individuals harming themselves and/or harming others.

According to a further aspect, there is provided a door handle assembly comprising the operator of any other aspect, example, embodiment or claim.

The door handle assembly may comprise the primary operator of any other aspect, example, embodiment or claim.

The operator may be integral or integrated with the door handle assembly. The operator may be connected or attached to the door handle assembly, such as permanently attached or connected thereto.

The operator may be configured to reduce a ligature risk, such as with the operator integral or associated with the door handle assembly. The operator may be configured to be flush with other surface/s of the door handle assembly and/or door, such as one or even all adjacent surface/s. The operator may be configured to reduce a ligature risk when in the stowed configuration. The operator may be inaccessible to unauthorised users when in the stowed configuration. The operator may be at least partially concealed, such as by adjacent portions and/or surfaces of the door and/or door handle assembly. The operator may be flush, such as flush with a surrounding surface/s (e.g. of the associated door, door furniture, fixing/s or the like) in the stowed configuration. The operator may be recessed in the stowed configuration.

The operator may be maintained in the stowed configuration, such as in normal use of the lock. The operator may be maintained locked in the stowed configuration until activated by an authorised user. The door handle assembly may comprise an operator securing means, such as for securing the operator in the stowed configuration. The stowed configuration may comprise a closed configuration of the operator.

According to a further aspect there is provided a door assembly comprising the operator or door handle assembly of any other aspect, example, embodiment or claim. The door handle assembly may be configured to ameliorate barricading. The door handle assembly may comprise an anti-barricade assembly.

The door assembly may comprise a door. The door may comprise an anti-barricade door. The door may comprise a door leaf, such as an anti-barricade, anti-weaponisation and/or anti-ligature leaf.

The door may be configured for buildings which house vulnerable individuals, such as buildings which house individuals with mental health problems. The door assembly may be configured to prevent or mitigate against individuals harming themselves and/or harming others. The door may comprise a double-swing door. The door may be configured to swing in a single direction in normal use, such as into a room. The door may be configured to swing in both or an opposite direction in an emergency situation, such as out of or both into and out of the room.

The door assembly may comprise an anti-barricade doorstop, such as a moveable or removable doorstop.

The door assembly may comprise a door frame.

According to a further aspect there is provided a method of operating a door lock, such as with the operator or door assembly of any other aspect, example, embodiment or claim. The method may comprise ameliorating barricading. The method may comprise configuring the operator between a stowed configuration and an activated configuration. The method may comprise operating a lock with the operator when in the activated configuration. The method may comprise rendering the operator inoperable when in the stowed configuration. The method may comprise configuring the operator to the activated configuration only by an authorized user. The method may comprise overriding another operator, such as a primary operator, with the operator in the activated configuration to operate the lock. The method may comprise operating the lock in normal, non-emergency use with the another operator.

The method may comprise progressively operating the lock with the operator. The method may comprise operating the lock with the operator to unlock the lock by pulling downwards on the operator.

The invention includes one or more corresponding aspects, embodiments or features in isolation or in various combinations whether or not specifically stated (including claimed) in that combination or in isolation. For example, it will readily be appreciated that features recited as optional with respect to the first aspect may be additionally applicable with respect to the other aspects without the need to explicitly and unnecessarily list those various combinations and permutations here (e.g. the operator of one aspect may comprise features of any other aspect). Optional features as recited in respect of a method may be additionally applicable to an apparatus or device; and vice versa. For example, an apparatus, such as an operator, may be configured to perform a method or method step of any other aspect, example, embodiment or claim. In addition, corresponding means for performing one or more of the discussed functions are also within the present disclosure.

It will be appreciated that one or more embodiments/aspects may be useful in at least operating a lock.

The above summary is intended to be merely exemplary and non-limiting.

Various respective aspects and features of the present disclosure are defined in the appended claims.

It may be an aim of certain embodiments of the present disclosure to solve, mitigate or obviate, at least partly, at least one of the problems and/or disadvantages associated with the prior art. Certain embodiments or examples may aim to provide at least one of the advantages described herein.

BRIEF DESCRIPTION OF THE DRAWINGS

These and other aspects of the present invention will now be described, by way of example only, with reference to the accompanying drawings, in which.

DETAILED DESCRIPTION

Figure 1:
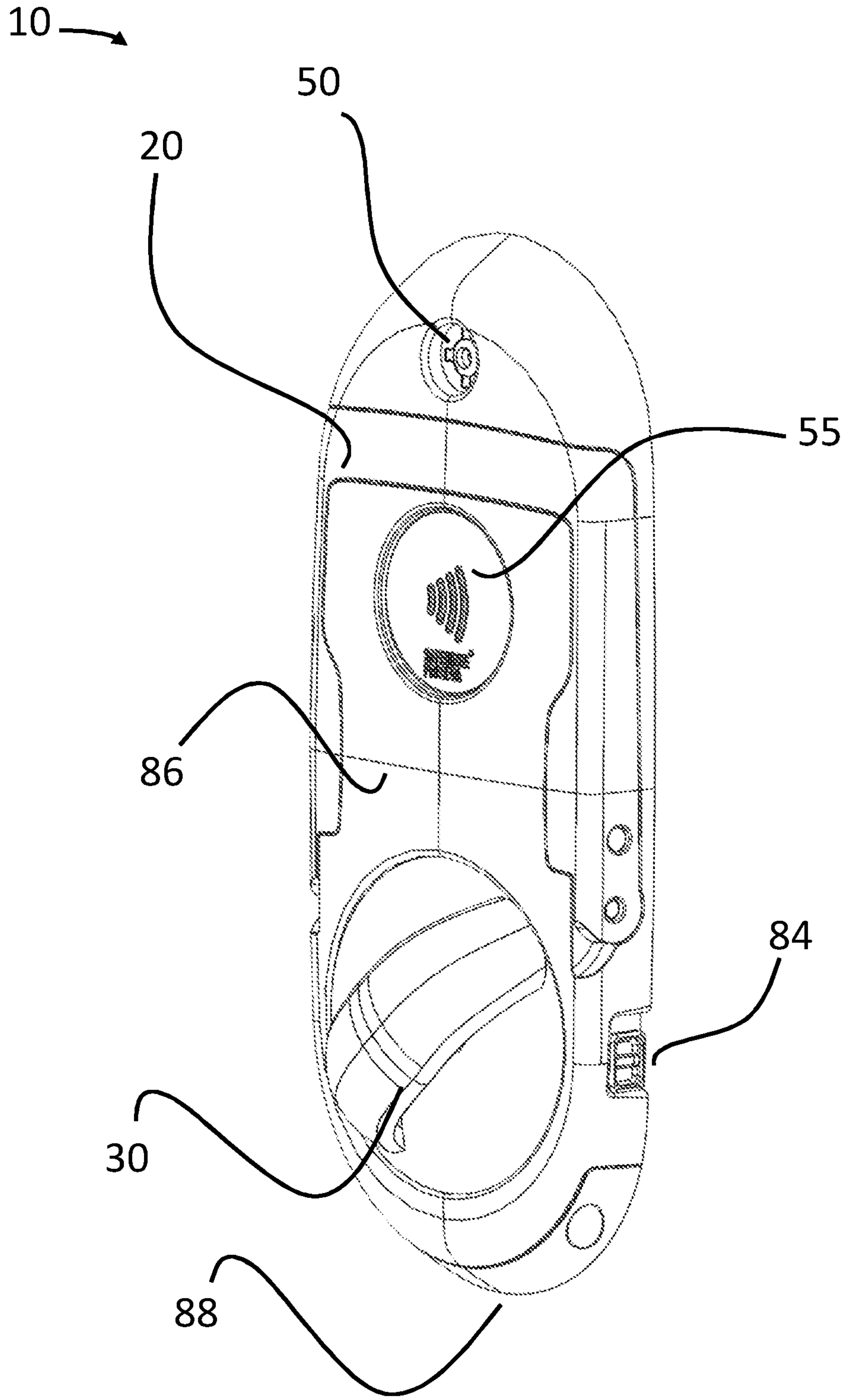
FIG. 1 is an isometric scale view of a portion of a door handle assembly according to a first example, with an auxiliary door handle shown in a stowed configuration.

Referring to FIGS. 1 to 7, there is shown an operator for operating a door lock 40. Here there is shown a door lock operator in the form of an auxiliary door handle 20 for use in an emergency. Accordingly, here there is shown a portion of a door handle assembly 10 according a first example, with the auxiliary door handle shown 20 in a stowed configuration in FIG. 1.

A door handle assembly 10 is configured to ameliorate barricading. The door handle assembly 10 comprises an integrated auxiliary door handle 20 for use in an emergency. The auxiliary door handle 20 is configurable between a stowed configuration, shown in FIG. 1, and an activated configuration, shown in FIG. 2. The auxiliary door handle 20 is operable to operate a lock 40 when in the activated configuration and inoperable when in the stowed configuration. The auxiliary door handle 20 is only configurable to the activated configuration by an authorized user. The auxiliary door handle 20 is configured to override a primary door handle 30 to operate the lock 40, the primary door handle being configured to operate the lock 40 in normal, non-emergency use.

As shown here, the auxiliary door handle 20 comprises a pull lever-handle. The handle is configured to operate the lock 40 by the auxiliary door handle 20 being pulled in a downwards direction. Operation of the auxiliary door handle 20 by a downward pulling motion enables a user to utilise a portion of their weight in the operation of the lock 40. Operation of the lock 40 comprises an unlocking operation, shown between FIGS. 2 and 3. Here, operation of the lock 40 comprises an at least temporary disablement of the lock 40, such as disablement in an unlocked configuration. The auxiliary door handle 20 comprises a pivot handle. The pivot handle pivots about a horizontal pivot axis 22 (shown in FIG. 4). The horizontal pivot axis 22 is in, or at least parallel to, a plane with the door 90, such as in plane with the side 92 of the door 90 to which the auxiliary door handle 20 is mounted. The auxiliary door handle 20 comprises a grip portion 24 attached to an arm 26. The grip portion 24 is spaced from the horizontal pivot axis 22 by the arm 26. The grip portion 24 is positioned above the horizontal pivot axis 22, here shown directly above the pivot axis in FIG. 1, when in the stowed configuration. The stowed configuration corresponds to a vertical position of the arm 26, as shown in FIG. 1. The auxiliary door handle 20 is configured between the stowed and activation configurations by pivoting about the horizontal pivot axis 22, as can be seen between FIGS. 1 and 2. The auxiliary door handle 20 operates the lock 40 by pivoting about the horizontal pivot axis 22, such as further downward pivoting from the activated configuration of FIG. 2 to the fully-operated configuration of FIG. 3. The activated configuration corresponds to an angle between the arm 26 and vertical of between 30 degrees and 60 degrees, such as about 45 degrees. The fully-operated configuration corresponds to the arm 26 being horizontal, with an angle of around 90 degrees between the arm 26 and vertical. The fully-operated configuration corresponds to a fully-unlocked configuration, as shown in FIG. 3.

Figure 6:
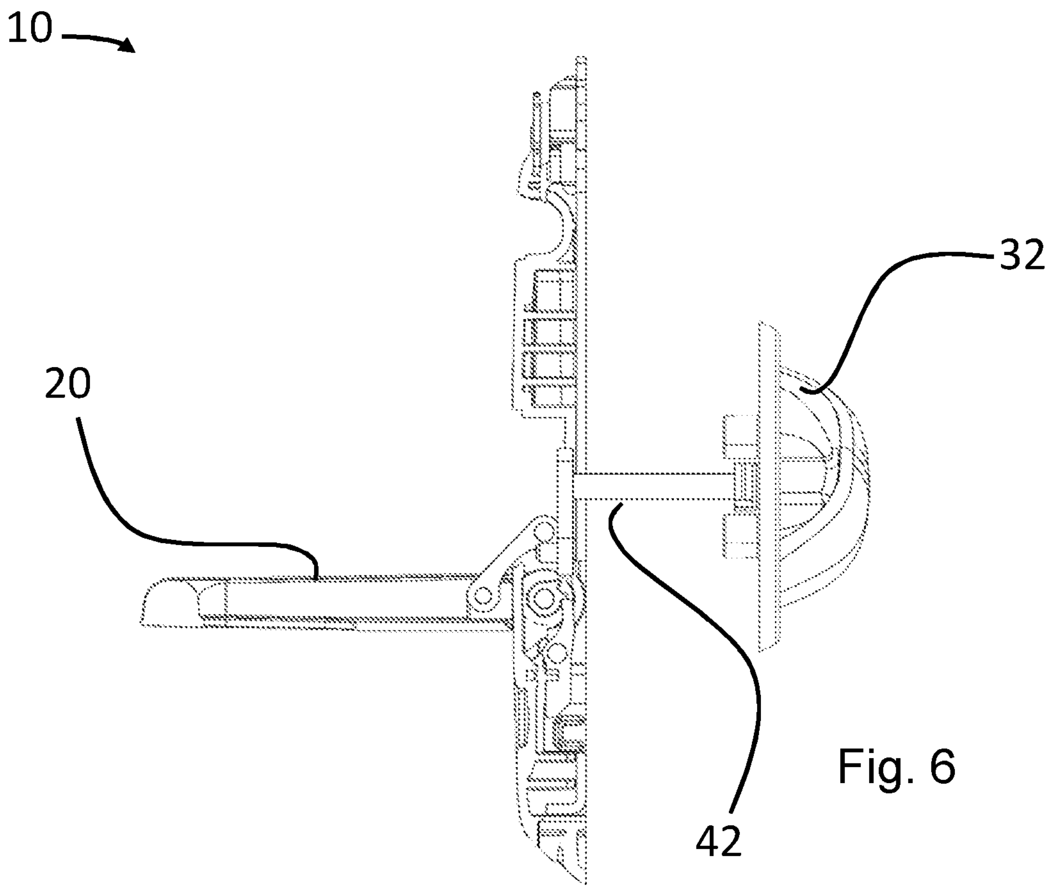
FIG. 6 shows a side cutaway view of the portion of the door handle assembly of FIG. 1.

Here, there is a pair of arms 26, 28, each arm 26, 28 connecting the grip portion 24 to the pivot axis. The grip portion 24 is positioned between upper ends of the arms 26, 28 (when in the stowed configuration). The lower ends of the arms 26, 28 are pivotably mounted to define the pivot axis 22. The auxiliary door handle 20 is configured to aid opening of the door 90, such as by providing a better grip for pulling the door 90 open via the auxiliary door handle 20 than via another operator, such as the primary handle 30. For example, the grip portion 24 of the auxiliary door handle 20 is configured to allow a power grip, such as with all of the user's fingers wrapping around the grip portion 24. A grip portion 34 of the other operator, such as of the primary handle 30, is configured to provide less grip than the grip portion 24 of the auxiliary door handle 20. It will be appreciated that a corresponding primary handle 32, as shown in FIG. 6, may be located on the opposite side of the door, with a grip portion similar to that of the primary handle 30 on the same side of the door as the auxiliary door handle 20. Accordingly, operation of the lock 40 by the auxiliary door handle 20 can ameliorate a barricading situation, such as to allow the unlocked door as shown in FIG. 3 to be pulled outwards with the auxiliary door handle 20, as also further explained below.

The auxiliary door handle 20 is configured for use by authorised personnel, such as for use only by authorised personnel. The auxiliary door handle 20 is configured to be inoperable by unauthorised personnel. The auxiliary door handle 20 is configured to be operable only when activated by an authorised user.

Figure 2:
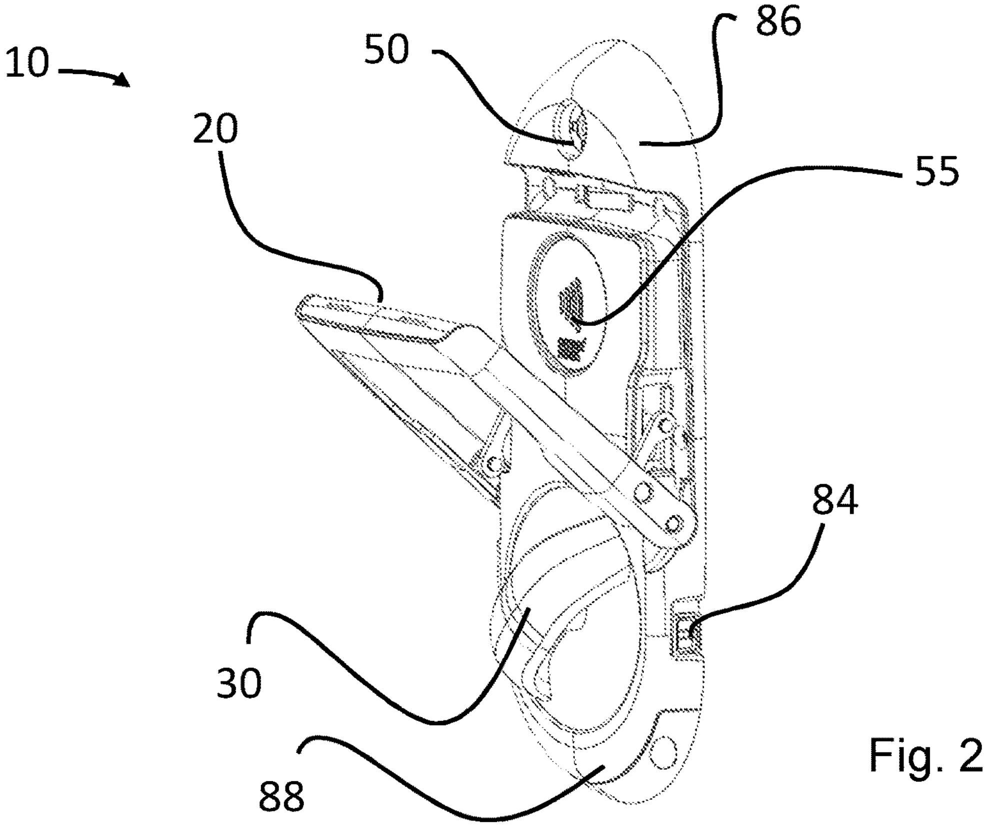
FIG. 2 is an isometric scale view of the portion of the door handle assembly of FIG. 1 mounted to a portion of a door, showing a portion of a lock, with the auxiliary door handle in an activated configuration.
Figure 3:
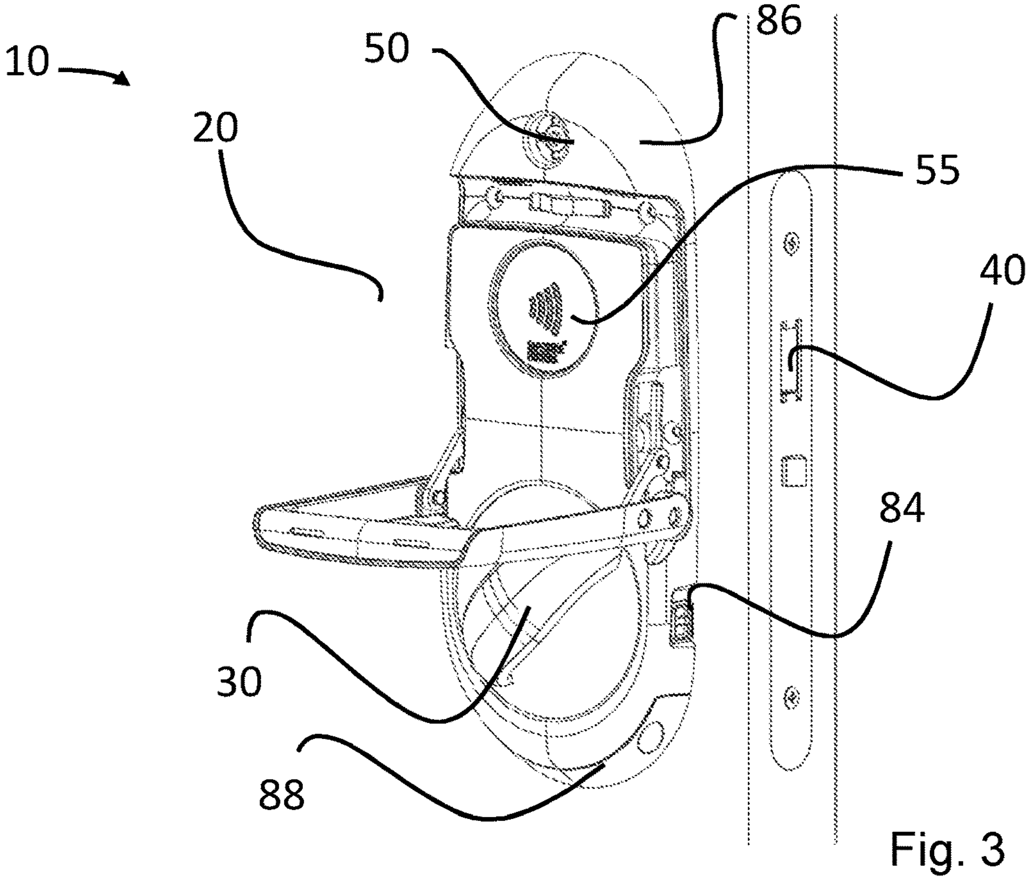
FIG. 3 is an isometric scale view of the portion of the door handle assembly of FIG. 2, with the auxiliary door handle in a fully-operated configuration, showing the portion of the lock retracted.

The auxiliary door handle 20 is reconfigurable between the stowed configuration of FIG. 1 and the primed or activated configuration of FIG. 2, and vice versa. The stowed configuration is whereby the auxiliary door handle 20 is inoperable and/or inaccessible, in particular here, inoperable and inaccessible for unauthorised personnel. The stowed configuration corresponds to a normal use configuration of the door handle assembly 10, such as where normal operation of the lock 40 is achieved via the primary handle 30. The primed or activated configuration of FIG. 2 corresponds to an emergency configuration, such as where emergency operation of the lock 40 is desired via the auxiliary door handle 20.

The method of operation comprises configuring the auxiliary door handle 20 between the stowed configuration and an activated configuration. The method comprises operating the lock 40 with the auxiliary door handle 20 from the activated configuration of FIG. 2. The method comprises rendering the auxiliary door handle 20 inoperable when in the stowed configuration, as shown in FIG. 1. The method comprises configuring the auxiliary door handle 20 to the activated configuration only by an authorized user. The method comprises overriding another operator, such as a primary handle 30, with the auxiliary door handle 20 in the activated configuration to operate the lock 40. The method comprises operating the lock 40 in normal, non-emergency use with the primary handle 30.

The method comprises progressively operating the lock 40 with the auxiliary door handle 20. The method comprises operating the lock 40 with the auxiliary door handle 20 to unlock the lock 40 by pulling downwards on the auxiliary door handle 20. In the primed or activated configuration, as shown in FIG. 2, the auxiliary door handle 20 is accessible for gripping by a user to operate the lock 40, such as to unlock the lock 40 in an emergency situation. The emergency situation may be a barricade situation, such as where the door 90 cannot be unlocked and/or opened, or at least not unlocked or opened easily, by operation of the primary handle 30.

The auxiliary door handle 20 is configured to be operable when activated by an activation element (not shown), such as an activation element associated with an authorised user. The activation element comprises an operator release tool. Here, the auxiliary door handle 20 is configured to be activatable by a mechanical activation element. For example, the auxiliary door handle 20 is configured to be discretely activated or primed by the mechanical activation element. In the example shown here, the auxiliary door handle 20 is not activatable by an electronic detector 55, but only by a mechanical keyway 50. The electronic detector 55 here allows the primary handle 30 to be activated by releasing a solenoid in the lock case 86. However, in other examples, the auxiliary door handle 20 can be configured to be activatable by either and both of the mechanical activation element or the electronic activation element. For example, the auxiliary door handle 20 can be configured to be discretely activated or primed by the mechanical activation element or the electronic activation element. Accordingly, the mechanical activation element and the electronic activation element provide alternative, redundant or back-up activation means, such as in an absence or failure of one of the electronic or the mechanical activation elements.

The mechanical activation element comprises a mechanical key receivable in a keyway 50. Here, the keyway 50 comprises an anti-tamper keyway, such as a Lifeline ™ keyway. The electronic activation element comprises a contactless activation element, such as a WiFi, RFID or similar element. Accordingly, here the door handle assembly comprises an electronic detector 55 for detecting the presence or proximity of the electronic activation element. Power supply for the detector 55 can be provided by battery, such as accessible via a battery access point 88. As will be appreciated, the method of operating the door lock 40 with the auxiliary door handle 20 comprises activating the auxiliary door handle 20 from the stowed configuration of FIG. 1 to the activated configuration of FIG. 2 by either one of the insertion and turning of a staff key (not shown) in the keyway 50 or the presentation of an electronic key, such as a fob, badge, wristband or the like to the electronic detector 55.

The auxiliary door handle 20 comprises a secondary operator, supplementary to a primary handle 30. The primary handle 30 and the secondary operator is located on a same side 92 of a door 90, such as both being located on an outside or exterior side of the door 90.

The auxiliary door handle 20 comprises an override operator. The auxiliary door handle 20 is configured to override at least one other operator, such as the primary handle 30. The auxiliary door handle 20 is configured to circumvent the primary handle 30, and particularly a corresponding primary handle 32. The auxiliary door handle 20 is configured to effectively disable and/or bypass the primary handle 30, and particularly the corresponding primary handle 32. The auxiliary door handle 20 is configured to dominate the primary handle 30, and particularly the corresponding primary handle 32.

Figure 4:
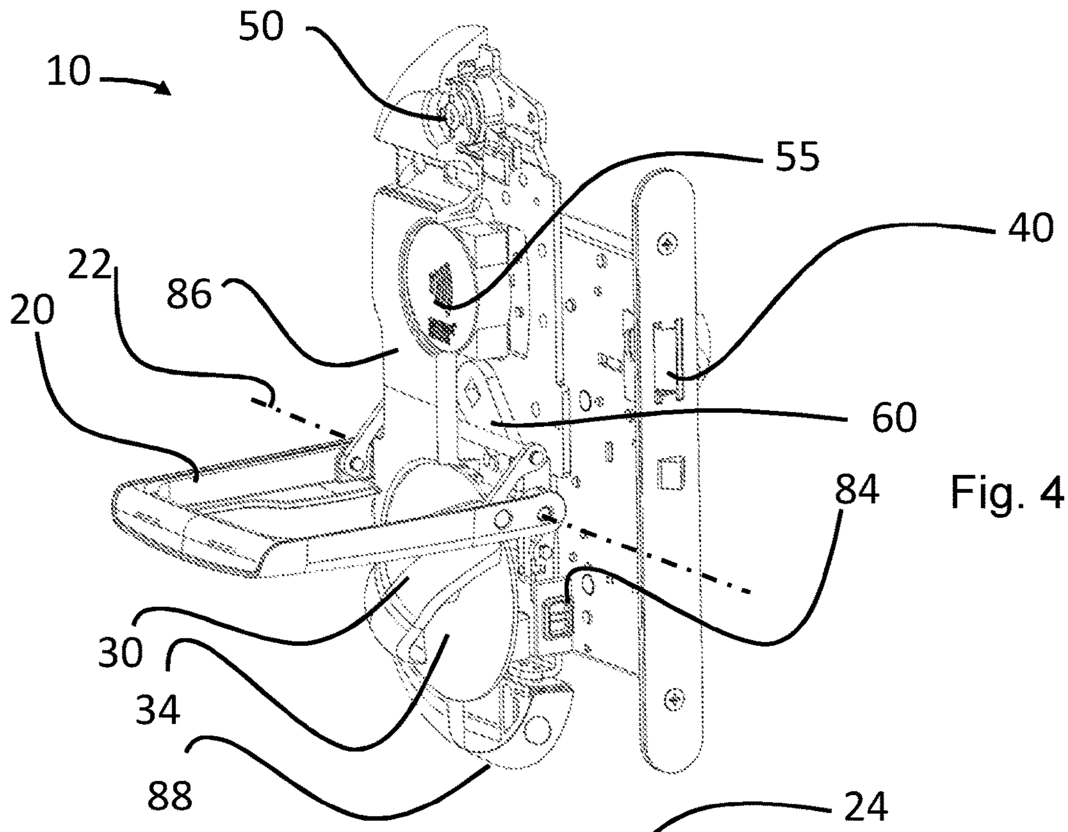
FIG. 4 is an isometric cutaway view showing the portion of the door handle assembly of FIG. 1.
Figure 5:
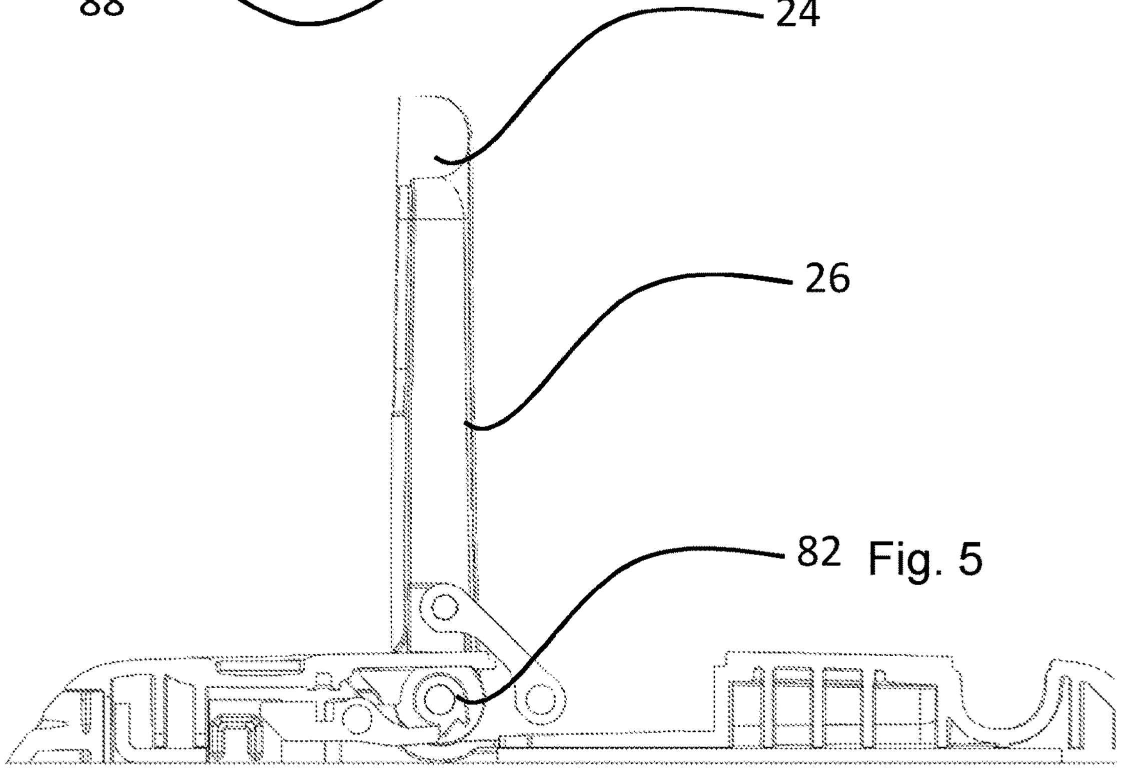
FIG. 5 is a partial cross-section view showing the portion of the door handle assembly of FIG. 1.

The auxiliary door handle 20 is configured to allow staged or progressive operation of the lock 40. In at least some examples, the auxiliary door handle 20 is configured to allow partial operation of the lock 40 by the auxiliary door handle 20, such that the authorised user can operate the lock 40 incrementally. The auxiliary door handle 20 comprises, or is configured to actuate, a progressive or one-way element. Providing a progressive or one-way element, such as a ratchet 82 as shown in FIGS. 4 and 5, enables the user to progressively operate the lock 40, such as in stages without losing all previous progress in operating the lock 40. For example, in an emergency situation whereby an unauthorised user, such as an inmate, patient, or the like, has attempted to barricade the door 90, the progressive or one-way element 82 enables the authorised user to exert force to operate the lock 40 incrementally in stages or bursts, without the lock 40 returning to the locked position, such as under force from an unauthorised user. The progressive or one-way element 82 is configured to prevent undesired reconfiguration of the lock 40. For example, the ratchet 82 effectively fixes the lock 40 in position, such as in an open, unlocked position; at least temporarily preventing or inhibiting reversion of the lock 40 to a locked or partially-locked configuration. The ratchet 82 can only be released from the side 92 of the authorised user, by activating a ratchet release 84.

The auxiliary door handle 20 is configured to exert a greater force on the lock 40. The auxiliary door handle 20 is configured to exert a greater torque on the lock 40. The auxiliary door handle 20 is configured to exert a greater moment on the lock 40. The greater force, torque and/or moment is greater than that exerted or exertable via the primary handle 30 and/or the corresponding primary handle 32. The auxiliary door handle 20 is configured to allow a user to exert a greater force, torque and/or moment on the lock 40. The auxiliary door handle 20 is configured to allow an authorised user to exert a greater force, torque and/or moment on the lock 40 than an unauthorised user. For example, where an authorised user is attempting to operate the lock 40 from one side of the door and an unauthorised user, such as a patient or inmate, on an opposite side of the door is barricading or attempting to barricade the door, the auxiliary door handle 20 may assist the authorised user in operating the lock 40, overriding the primary 30 or corresponding primary handle 32 accessible by the unauthorised user on the opposite side of the door. The auxiliary door handle 20 provides a longer lever arm than the primary and/or corresponding primary handle/s 30, 32. The auxiliary door handle 20 provides a greater force, torque and/or moment in the order of at least two times, optionally at least three times, optionally at least five times, that of the primary and/or corresponding primary handles 30, 32.

The auxiliary door handle 20 is connected to the lock 40 via a linkage 60. The linkage 60 provides a mechanical advantage, such as between where force is applied by a user (e.g. the grip portion 24) and the lock 40. The linkage 60 contributes to a total mechanical advantage of the auxiliary door handle 20 that exceeds a mechanical advantage available via the primary handle 30 and/or corresponding primary handle 32. The mechanical advantage comprises a force, torque and/or moment.

The primary handle 30 here comprises a turn/pull handle. Here, the primary handle 30 is not connected directly to a corresponding primary handle 32 on an opposite side of the door, such as a corresponding primary handle 32 on an interior side 94 of the door 90 when the primary handle 30 is located on an exterior side 92 of the door 90 as shown here. The primary handle 30 and the corresponding primary handle 32 here are both connected to different spindles within the lock case 86. Thus, in the example shown here, the lock case 86 has two spindle connections. An upper spindle 42 connects to the corresponding primary handle 32. This spindle 42 is also connected directly to the auxiliary handle 20 when it is activated. This allows the auxiliary handle 20 to override or apply force/torque/moment directly to the corresponding primary handle 32 so that if force is applied to the corresponding primary handle 32, it can be overcome. The corresponding primary handle 32 here is connected to the lock 40 via the spindle 42 passing through an aperture 62 in the linkage 60. Here, a lower spindle is connected to the primary handle 30. This primary handle 30 cannot be used unless the electronic detector 55 is activated by an appropriate or authorised electronic activation element (e.g. by staff and service users who are allowed access). This primary handle 30 will always release the lock 40 as it is able to bypass the corresponding handle 32/spindle within the lock case 86. In other examples, the primary handle 30 can be connected to the lock 40 and the corresponding primary handle 32, such as directly connected (e.g. via a single spindle).

The connecting members are configured to prevent or at least impede operation of the lock 40 by at least one primary handle 30, such as to prevent or at least impede operation by the primary handle 30 or corresponding primary handle in an emergency and/or during operation of the auxiliary door handle 20. In at least some examples, the spindle 42 comprises a predefined weakness configured to break at a predefined location. The predefined location may prevent or at least impede operation of the lock 40 from a particular handle. For example, the predefined location here disconnects the corresponding primary handle 32. The spindle 42 is configured to fail at the predefined weakness only at a or above a predetermined load. The predetermined load is above a normal use load. The predetermined load corresponds to a load anticipated in an emergency or barricade situation.

The auxiliary door handle 20 comprises an anti-ligature handle. The auxiliary door handle 20 is configured to impede or at least reduce a risk of ligature attachment, at least when in the stowed configuration. The auxiliary door handle 20 is configured to reduce a ligature risk, such as with the auxiliary door handle 20 being integral or associated with the door handle assembly 10. The auxiliary door handle 20 is inaccessible to unauthorised users when in the stowed configuration. The auxiliary door handle 20 is at least partially concealed, at least when in the stowed configuration. The auxiliary door handle 20 here is at least partially concealed by adjacent portions and/or surfaces of the door 90 and door handle assembly 10, such as adjacent housing 86 of the door handle assembly 10. The auxiliary door handle 20 is flush, such as flush with a surrounding surface/s (e.g. of the associated door, door furniture, fixing/s or the like) in the stowed configuration. In other examples (not shown), the auxiliary door handle 20 is configured to be recessed.

The auxiliary door handle 20 is tamper-proof or at least tamper-resistant.

As shown here, the lock 40 comprises a latch, such as a sprung latch, night latch or the like. In other examples, the lock 40 comprises a bolt, such as a spring-bolt, deadbolt or the like.

The auxiliary door handle 20 is configured for buildings which house vulnerable individuals, such as buildings which house individuals with mental health problems. The auxiliary door handle 20 is configured to prevent or mitigate against individuals harming themselves and/or harming others.

As shown here, the auxiliary door handle 20 is integral or integrated with the door handle assembly 10. The auxiliary door handle 20 is connected or attached to the door handle assembly 10, such as permanently attached or connected thereto. Accordingly, as shown here, the auxiliary door handle 20 is permanently located at the door where it is to be used. Advantageously the auxiliary door handle 20 may preclude requirement of an attachable or remote handle or lever, such as required by Safehinge Primera's previous anti-ligature mechanical 5-way SOS lock set (PR3S) as available at the time of filing this application. Ensuring the auxiliary door handle 20 is permanently at or attached to the door handle assembly 10 and door 90 ensures that there is an auxiliary door handle 20 always available at each such door 90. In contrast, prior systems may require an attachable handle such that there may not always be a handle available (e.g. where two or more doors require emergency access with the attachable handle); or valuable time may be lost retrieving the attachable handle to the required door.

Figure 7:
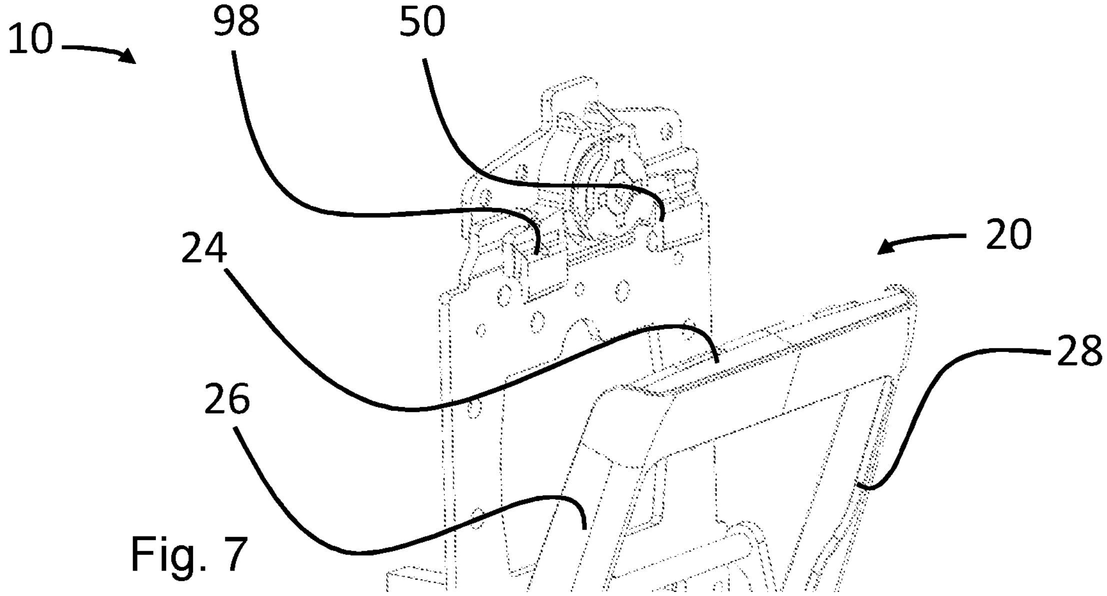
FIG. 7 shows an isometric cutaway part of the portion of the door handle assembly of FIG. 1.

The auxiliary door handle 20 is maintained in the stowed configuration, such as in normal use of the lock 40, as shown in FIG. 7. The auxiliary door handle 20 is maintained locked in the stowed configuration until activated by an authorised user. The door handle assembly 10 comprises a securing means for securing the auxiliary door handle 20 in the stowed configuration, shown here in the form of a catch 98. The stowed configuration comprises a closed configuration of the auxiliary door handle 20. It will be appreciated that activation of the auxiliary door handle 20 (with the mechanical or electronic key) automatically releases the auxiliary door handle 20 to the position shown in FIG. 2.

The door handle assembly 10 here comprises an anti-barricade assembly. It will be appreciated that the door 90 may comprise an anti-barricade door.

It will be appreciated that the present examples can allow access into a barricaded doorway. For example, a barricade can be created by placing objects in the way of the door swing, tampering with the lockset or handle or an individual holding onto the door or wedging it in place by trapping items between the door and frame, preventing access to the room. The present disclosure enables the release of a latch to override the internal handle or grip to open the door in a barricade situation, and enough pull force created to be able to overcome an individual holding a corresponding handle and having wedged the door. The pulling of the door can only be achieved on an anti-barricade door. Such pulling on the auxiliary door handle 20 will work on an anti-barricade door (inward day to day, outward in emergency), double swing or outward opening doors.

The door 90 here is configured for buildings which house vulnerable individuals, such as buildings which house individuals with mental health problems. The door assembly is configured to prevent or mitigate against individuals harming themselves and/or harming others. The door 90 here comprises a double-swing door. The door 90 is configured to swing in both directions in an emergency situation, such as either into or out of the room.

In at least some examples (not shown), the door assembly comprises an anti-barricade doorstop, such as a moveable or removable doorstop.

It will be appreciated that some of the advantages enabled by the present disclosure may include: incorporation of a mechanical override directly into the door that provides increased torque and pull force and can be achieved in <5 seconds. An advantage of the present disclosure may include: requirement of only a secure, anti-tamper key to release an intuitive emergency lever handle. An advantage of the present disclosure may include: pulling down on the lever handle releases the latch through a linkage mechanism that applies 3× mechanical advantage to the spindle over the internal turn/pull. An advantage of the present disclosure may include: no loose parts are created when using the product as the system is fixed securely to the door. An advantage of the present disclosure may include: the ratchet system holds the latch open so the user on the other side of the door cannot relock the door and also helps to create a steady handle for the staff member to pull the door open with. An advantage of the present disclosure may include: providing pull advantage can be as beneficial as overriding the lock as this will allow the staff member to overcome resistance—such as from something being trapped between the door and frame or from a patient holding onto the handle.

It will be appreciated that any of the aforementioned apparatus may have other functions in addition to the mentioned functions, and that these functions may be performed by the same apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims.

The applicant indicates that aspects of the present invention may consist of any such individual feature or combination of features. It should be understood that the embodiments described herein are merely exemplary and that various modifications may be made thereto without departing from the scope or spirit of the invention. For example, it will be appreciated that although shown here with a latch or night latch, other examples may include bolts, deadbolts and the like.

The invention claimed is:

1. A door handle assembly configured to ameliorate barricading of a door by an unauthorised user, the door handle assembly comprising:
- a door lock;
- a primary door handle, the primary door handle being configured to perform a lock operating function to operate the door lock in normal, non-emergency use;
- a pivotal auxiliary door handle for use in operating the door lock in an emergency, the auxiliary door handle being integrated in the door handle assembly;
- wherein the auxiliary door handle is configurable to pivot between a stowed configuration and an activated configuration, the auxiliary door handle being inoperable when in the stowed configuration and operable to operate the door lock when in the activated configuration;
- when activated the auxiliary door handle overrides the lock operating function of the primary door handle to operate the door lock; and
- wherein the auxiliary door handle is only configurable from the stowed configuration to the activated configuration with use of a key.

2. The door handle assembly of claim 1, wherein the auxiliary door handle is configured to be activatable by at least one of a mechanical key and an electronic key.

3. The door handle assembly of claim 2, wherein the auxiliary door handle is configured to be activatable by each of the mechanical key and the electronic key, the mechanical key and the electronic key providing alternative activation means in an absence or failure of the other of the electronic or the mechanical key.

4. The door handle assembly of claim 2, wherein the mechanical key comprises a key receivable in a keyway; and the electronic key comprises a contactless electronic key.

5. The door handle assembly of claim 1, wherein the auxiliary door handle comprises a grip portion that is inaccessible when the auxiliary door handle is in the stowed configuration; with the grip portion only being accessible for gripping to operate the lock when the auxiliary door handle is in the activated configuration.

6. The door handle assembly of claim 1, wherein the auxiliary door handle comprises a pull lever-handle, configured to operate the lock by the auxiliary door handle being pulled in a downwards direction.

7. The door handle assembly of claim 6, wherein the auxiliary door handle is configured to pivot about a horizontal pivot axis, the horizontal pivot axis being in a plane with the door; the auxiliary door handle comprising a grip portion attached to a pair of arms, the grip portion being spaced from the horizontal pivot axis by the arms.

8. The door handle assembly of claim 7, wherein the grip portion is positioned directly above the horizontal pivot axis when the auxiliary door handle is in the stowed configuration.

9. The door handle assembly of claim 7, wherein the stowed configuration corresponds to a vertical position of a longitudinal axis of the arms, the longitudinal axis of the arms being perpendicular to the horizontal pivot axis, with the auxiliary door handle being configurable between the stowed and activation configurations by pivoting about the horizontal pivot axis; and the auxiliary door handle being operable to operate the lock by further downward pivoting about the horizontal pivot axis from the activated configuration to a fully-operated configuration.

10. The door handle assembly of claim 9, wherein the activated configuration corresponds to an angle between the arms and vertical of between 30 degrees and 60 degrees.

11. The door handle assembly of claim 9, wherein the fully-operated configuration corresponds to the arms being horizontal, with an angle of around 90 degrees between the arms and vertical.

12. The door handle assembly of claim 1, wherein the auxiliary door handle comprises a longer lever than the primary door handle to provide a greater torque in the order of at least two times that of the primary door handle.

13. The door handle assembly of claim 1, wherein the auxiliary door handle comprises an anti-ligature door handle, whereby a grip portion of the auxiliary door handle is inaccessible when the auxiliary door handle is in the stowed configuration.

14. The door handle assembly of claim 1, wherein the auxiliary door handle is configured to pivot about a horizontal pivot axis; and
- the door handle assembly comprises a ratchet associated with the horizontal pivot axis, the ratchet being connected to the auxiliary door handle to inhibit lock movement by the auxiliar to one-way movement such that the auxiliary handle can be repeatedly operated to progressively operate the lock to incrementally open the lock in stages.

15. The door handle assembly of claim 14, wherein the ratchet is configured to fix the lock in position, at least temporarily inhibiting reversion of the lock to a locked configuration.

16. A method of ameliorating door barricading by an unauthorised user, the method comprising a nonemergency use unlocking method where a primary door handle is configured to unlock a door lock of a barricaded door, and an alternative unlocking method for use in an emergency situation where the barricaded door is locked, and during the alternative unlocking method the door lock cannot be unlocked by the primary door handle, the method comprising the steps of:

providing a door with a door handle assembly comprising a lock, a primary door handle for normal, non-emergency use, and an integrated pivotal auxiliary door handle for use in an emergency stowing the auxiliary door handle in an inactive configuration, whereby the auxiliary door handle is inoperable when stowed;

reconfiguring the auxiliary door handle to pivot from the stowed, inactive configuration to an activated configuration, whereby the auxiliary door handle in the activated configuration is operable to operate the lock;

operating the lock with the auxiliary door handle when in the activated configuration;

wherein the auxiliary door handle is only reconfigurable from the stowed, inactive configuration to the activated configuration with use of a key.

17. A door handle assembly configured to ameliorate barricading of a door by an unauthorised user, the door handle assembly comprising:

a door lock;

a primary door handle configured to perform a lock operating function to operate a lock in normal, non-emergency use; and a pivotal auxiliary door handle for use in operating the door lock in an emergency. the auxiliary door handle being integrated in the door handle assembly;

wherein the auxiliary door handle is configurable to pivot between a stowed configuration and an activated configuration, the auxiliary door handle being inoperable when in the stowed configuration and operable to operate the door lock when in the activated configuration;

wherein the primary door handle and the auxiliary door handle are located on a same side of a door; and wherein the auxiliary door handle in the activated configuration overrides the lock operating function of the primary door handle to operate the lock in emergency use.

18. The door handle assembly of claim 1, wherein the auxiliary door handle comprises at least one of a longer lever than the primary handle and a one-way ratchet element, such that the auxiliary door handle, when operated in the activated configuration, overrides the primary handle by exerting a greater force on the lock than exertable via the primary door handle.

19. The door handle assembly of claim 1, wherein the door handle assembly is incorporated in a door.

* * * * *